Jan. 3, 1956  R. W. KENNEY  2,729,230
CONTROL FOR SEPARATOR DRAIN VALVE
Filed June 23, 1952  2 Sheets-Sheet 2
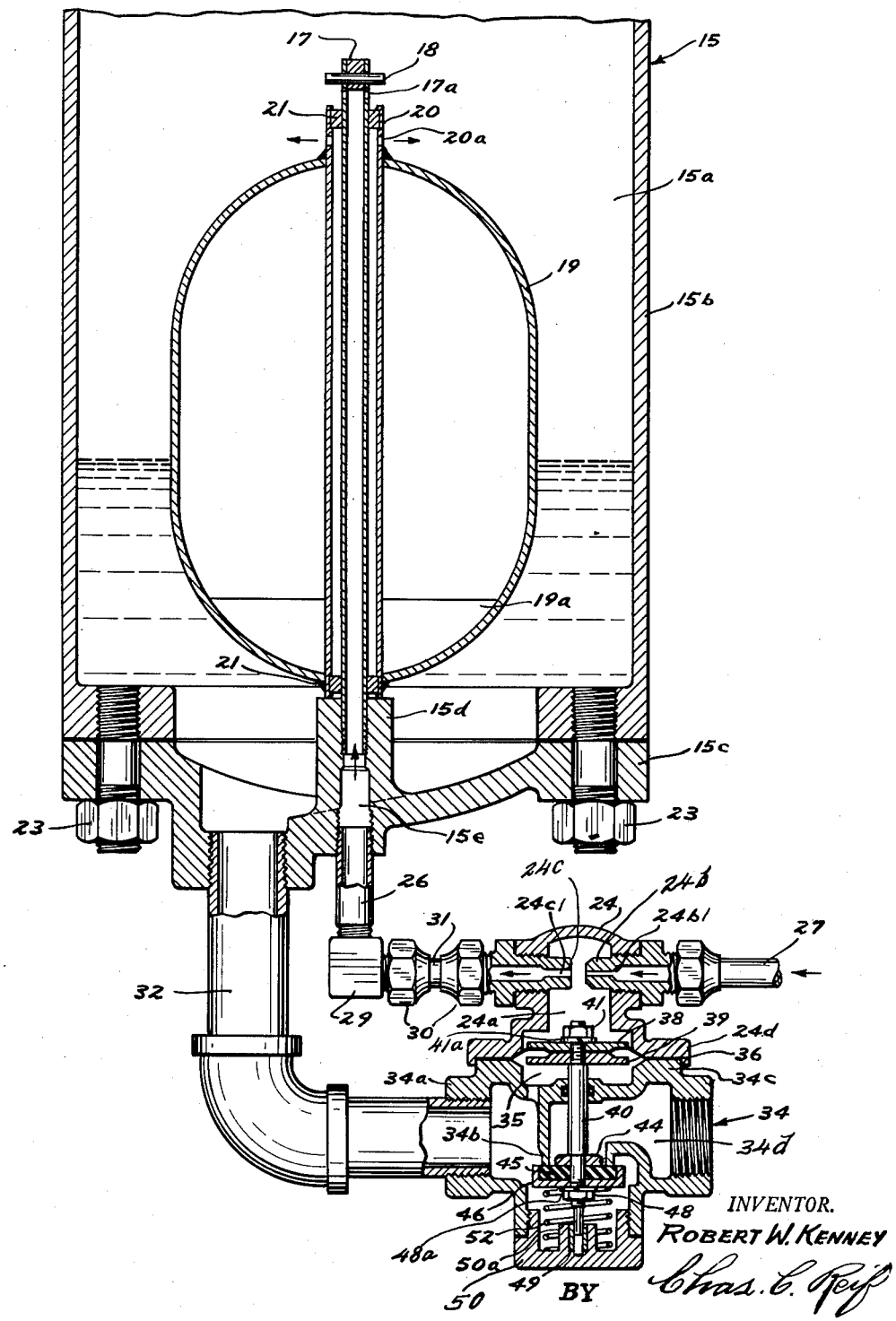
INVENTOR.
ROBERT W. KENNEY
BY Chas. C. Reyf
ATTORNEY

United States Patent Office 2,729,230
Patented Jan. 3, 1956

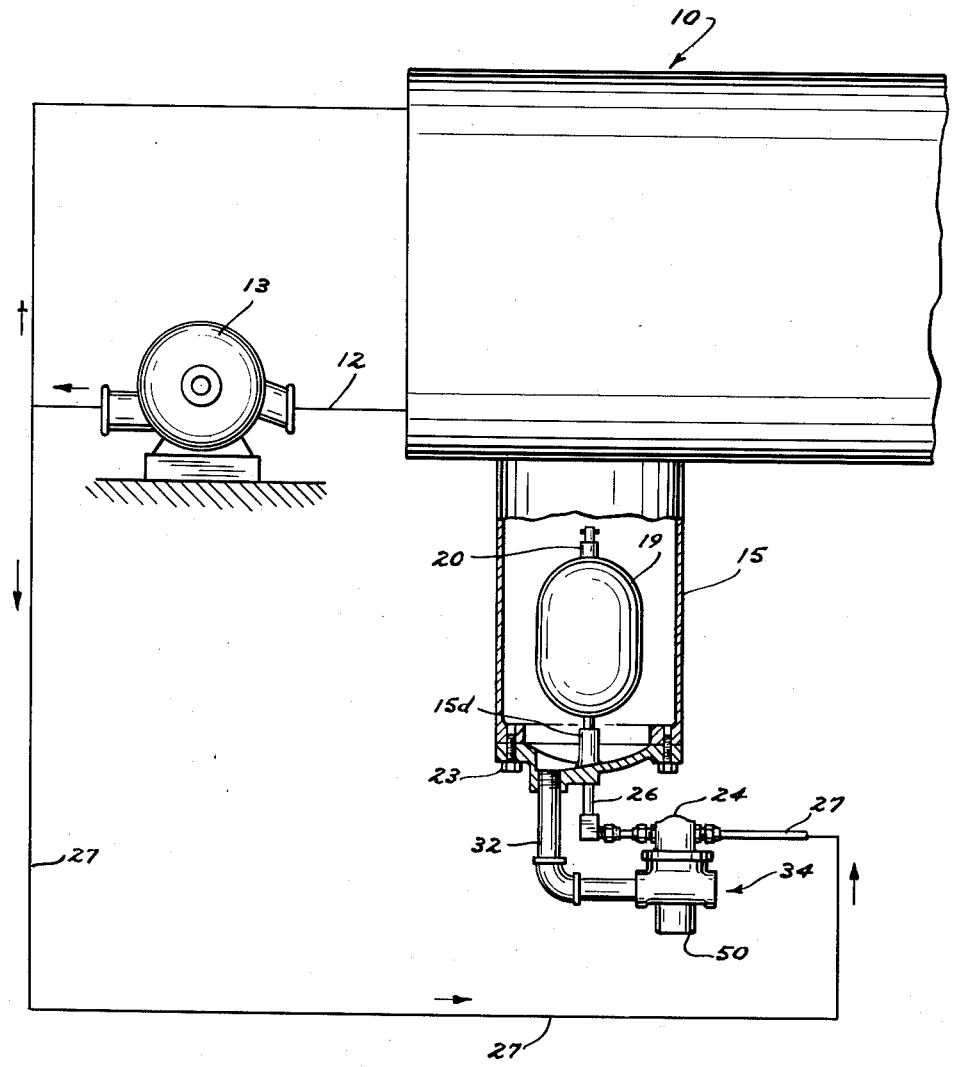

2,729,230
CONTROL FOR SEPARATOR DRAIN VALVE

Robert W. Kenney, South Pasadena, Calif., assignor to Stanley G. Harwood, South Pasadena, Calif.

Application June 23, 1952, Serial No. 294,960

8 Claims. (Cl. 137—204)

This invention relates to a control system used in connection with a tank. The invention here disclosed is particularly adapted to be used with a tank in the bottom of which there collects water separated from a hydrocarbon liquid. More particularly, applicant's invention is adapted to be used with a tank, such as a gasoline or fuel tank, mounted or installed on a truck.

It is an object of this invention to provide a control for use with a tank, such as a tank mounted on a truck, and adapted to control the discharge of water separated from a hydrocarbon liquid in said tank.

It is another object of this invention to provide a control for use with a tank comprising a container adapted to accumulate a separated liquid therein and a float controlled pressure operated means adapted to effect the discharge of said liquid at intervals.

It is also an object of this invention to provide a control for use with a tank comprising a container adapted to accumulate a separated liquid therein, a conduit extending into said container and adapted to have a liquid under pressure flow therethrough and into said container, a pressure chamber in said conduit, a discharge passage extending from said container, means for opening and closing said passage and said means adapted to be activated by said pressure in said pressure chamber.

It is more specifically an object of this invention to provide a control device for a tank comprising a container adapted to accumulate separated liquid therein, an inlet conduit having a portion extending into said container and adapted to have another liquid under pressure pass therethrough into said container, a float movable on said conduit in said container for controlling the flow of said second mentioned liquid into said container, an ejector and pressure chamber in said conduit, a discharge passage from said container for said separated liquid, a valve in said passage, means for opening and closing said valve, and said last mentioned means controlled by said pressure in said pressure chamber.

These and other objects and advantages of the invention will be fully set forth in the following description made in connection with the accompanying drawings in which like reference characters refer to similar parts throughout the several views and in which:

Fig. 1 is a diagrammatic view in side elevation with some parts in section and some parts broken away; and Fig. 2 is a view in central vertical section through a chamber and float used, with some parts in side elevation and all on an enlarged scale.

Referring to the drawings, a vessel or tank 10 is shown. In the embodiment of the invention illustrated this is shown to be a tank adapted to be carried on a truck and to contain therein a hydrocarbon liquid, such as gasoline. While said tank 10 could be variously formed, it is illustrated as cylindrical. A conduit 12 is shown connecting said tank to a pump 13. Said pump will be driven by any suitable means, such as the motor of the truck, and is adapted to pump liquid out of said tank. While various types of pumps may be used, pump 13 is shown as a rotary pump.

Water becomes separated from the hydrocarbon liquid in said tank and collects at the bottom of said tank. A container 15 is shown and the same is disposed to have said water from said tank pass downwardly thereinto. Container 15 is illustrated as cylindrical and has a chamber 15a therein. Said container 15 is shown as formed of an upper portion 15b and a lower portion 15c. A plurality of circumferentially spaced headed bolts 23 are provided for securing said portion 15c to portion 15b. A conduit 17 extends vertically in container 15 and the same is illustrated as being substantially coaxial with container 15. Conduit 17 is shown as being threaded into a boss 15d which upstands substantially centrally from said lower portion of container 15. Conduit 17 is closed at its upper end and a pin 18 extends transversely therethrough and projects at either side thereof. Conduit 17 has two or more circumferentially spaced openings 17a therein adjacent its top. It will be seen that said openings permit communication between container 15 and conduit 17. A float 19 is provided, and while this might take various forms, in the embodiment of the invention as illustrated, it is shown as a closed vessel having rounded upper and lower ends and having a substantially semi-spherical member 19a in its bottom. A tube 20 extends through float 19 substantially axially thereof, the same extending through the upper end thereof and being welded thereto. Tube 20 is closed at its upper and lower ends by bearing members or collars 21. Tube 20 has two or more circumferentially spaced openings 20a just above the top of float 19 which afford communication between tube 20 and container 15.

An ejector 24 is provided having a chamber 24a therein. A conduit 26 is secured to the lower portion 15c of container 15 and communicates with chamber 24a. The boss 15d is bored between conduits 17 and 26 so that said bore 15e and conduits 17 and 26 can be considered as one conduit. Said ejector 24 also comprises a nozzle 24b forming a primary passage 24b1 directed into chamber 24a. A secondary passage 24c1 extends through a nozzle 24c having a somewhat larger bore than nozzle 24b and leads from chamber 24a.

Passage 24c1 has a flaring outer end. Passage 24b1 communicates with a conduit 27 and said conduit 27 communicates with the outlet side of pump 13. Conduit 26 is secured by suitable coupling members 29, 30 and 31 to ejector 24.

A drain conduit 32 is secured to the bottom of container 15 and is connected to a valve body 34a of a valve 34. Valve 34 has a valve seat 34b. Ejector 24 comprises a flange 24d with a flat surface to which is secured a flange-like portion 34c of valve 34. Portion 34c has a circumferential flat surface adapted to fit against said flange 24d. A diaphragm 36 of flexible material is disposed between said portions 24d and 34c, which portions will be connected by some suitable means. Said diaphragm is respectively engaged at its upper and lower central portions by plates 38 and 39. A rod 40 is provided having a reduced threaded upper end portion which extends centrally through plate members 38 and 39 and through diaphragm 36. Plates 38 and 39 are clamped to diaphragm 36 by a nut 41 overlying a split washer 41a. A chamber 35 is formed between diaphragm 36 and the upper portion of valve body 34a. Said rod 40 extends through the web portion in valve 34 and has a reduced lower end portion. Carried on said lower reduced portion is a valve plate 45 of yielding material arranged to engage seat 34b and carried in a cup-shaped plate 46. A nut 48 and washer 48a on rod 40 clamps plate 44 against members 45 and 46. The lower end of rod 40 is movable in a bushing 49 disposed in a boss 50a which is upstanding from a cap or plug 50 threaded into the lower end of valve 34. A coiled tension spring 52 is provided having its lower end portion disposed about said boss 50a and bearing at one end against plug 50 and having its upper end bearing against plate 46. Valve 34 has a chamber 34d therein.

In operation, when a tank 10 is filled with a hydrocarbon liquid, a considerable amount of water is sometimes mixed with said liquid and part of this water drops to the bottom of said tank and collects there. Container 15 is connected to said tank and adapted to receive therein water which is separated from the hydrocarbon liquid. Fig. 2 shows container 15 with insufficient water therein to raise float 19. Pump 13 will be operating causing the hydrocarbon liquid to flow into conduit 12 and thence through ejector 24. Said liquid enters into the primary passage 24b and passes out through secondary passage 24c. The action of said liquid moving from the primary and through the secondary passages lowers the pressure in chamber 24a. As a result the pressure in chamber 35 and the pressure of spring 52 are sufficient to hold valve 45 in closed position, as shown. Said hydrocarbon liquid moves upwardly through conduit 17 and out of openings 17a into chamber 15a of container 15.

When sufficient water has collected in container 15, float 19 and tube 20 will rise upwardly until pin 18 is reached and said upper bearings 21 will have closed openings 17a thus stopping the flow of liquid through conduit 17. This action will cause pressure to be built up in chamber 24a. This pressure will bear upon diaphragm 36 which will force rod 40 and valve 45 downwardly into open position thus opening valve 34. Water will now pass from container 15, through conduit 32 and out through valve 34 to the desired receptacle.

As the water level in container 15 falls, float 19 will descend and permit openings 17a to become opened again. With openings 17a in uncovered position, liquid will again flow through conduit 17, the ejector 24 will function, the pressure in chamber 24a will be lowered, and valve 45 will be moved to closed position by the pressure in chamber 35 and the pressure of spring 52. A complete cycle of the operation of applicant's device has thus been described.

Thus it is seen that I have provided a very simple and efficient means for discharging water from container 15 whenever the water in said container reaches certain levels. The device is very simple, there are few moving parts involved and the parts are all quite rugged so that no operating difficulties will be involved. This device has been amply demonstrated in actual practice and found to be very successful in operation.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. In connection with a tank in the bottom of which water collects, a drain valve structure having in combination, a container communicating with said tank and adapted to receive said water therefrom by gravity, an inlet passage into said container, a pump for pumping a hydrocarbon liquid through said passage into said container, an ejector disposed in said passage, a member controlling said ejector by controlling the discharge of said liquid from said passage into said container, a drain conduit permitting the discharge of water from said container, a valve controlled by said ejector for controlling the discharge of water through said drain conduit when a certain amount of water has collected in said container, 2. In connection with a tank in the bottom of which water collects, a drain valve structure having in combination, a container communicating with the lower side of said tank and adapted to receive said water therefrom by gravity, an inlet passage into said container, a pump for pumping a hydrocarbon liquid through said passage into said container, an ejector disposed in said passage, a float means in said container for controlling the discharge of said hydrocarbon liquid into said container from said passage and controlling the operation of said ejector, said float being actuated by said water, a drain conduit for permitting the discharge of water from said container, and a valve for controlling the discharge of said water through said drain conduit and operated by said ejector.

3. In connection with a tank in the bottom of which water collects, a drain valve structure having in combination, a container communicating with the lower side of said tank and being so connected as to receive said water by gravity therefrom, an inlet passage into said container, a pump for pumping a liquid lighter than water through said passage into said container, an ejector having a chamber in said passage, a float control means in said container, said float control means being arranged to control the flow of said liquid from said passage into said container and to control pressure in said chamber, a drain conduit for permitting the discharge of water from said container, and a valve for controlling said discharge of water through said conduit means for resiliently holding said valve in closed position, and said valve being opened for the discharge of said water by said pressure in said chamber.

4. A drain valve structure adapted to be used in connection with a tank in the bottom of which a liquid collects, a container communicating with said tank and adapted to receive said liquid therefrom, a conduit communicating with said container and extending upwardly thereinto for some distance, said conduit having openings at its upper end portion, a float movable on said conduit in said container movable by said liquid in said container, a fluid lighter than said liquid adapted to move through said conduit under pressure, a second conduit communicating with said container and adapted to have said liquid from said container discharge therethrough, a valve structure comprising a casing having a portion connected with said first conduit and having a second portion connected with said second conduit, said first portion having a pressure chamber therein, said second portion having an inlet and an outlet chamber adapted to have communication, a pressure actuated means having a portion acted upon by pressure in said pressure chamber and having a second portion adapted to be placed in open or closed position for opening or closing communication between said inlet and outlet chambers, and a resilient member holding said means in closed position whereby when said float is raised to cover said openings and said fluid in said first conduit builds up a pressure in said pressure chamber, said means will be moved to open position and said liquid in said second conduit will move through said inlet and outlet chambers and when said float is lowered and said pressure in said pressure chamber is decreased, said means will be automatically moved to closed position and will shut off communication between said inlet and outlet chambers.

5. A drain valve structure adapted to be used in connection with a tank in the bottom of which a liquid collects, a container communicating with said tank and adapted to receive said liquid therefrom, a conduit communicating with said container and extending upwardly thereinto for some distance, said conduit having openings at its upper end portion, a float movable on said conduit in said container movable by said liquid in said container, a fluid lighter than said liquid adapted to move through said conduit under pressure, a second conduit communicating with said container and adapted to have said liquid from said container discharge therethrough, a valve structure comprising a casing having said first conduit connected with a portion thereof and having said second conduit connected with a second portion thereof, said first portion having an ejector and pressure chamber therein, said second portion having an inlet chamber for receiving liquid from said second conduit and an outlet chamber for discharging said liquid from said second conduit, said inlet and outlet chambers having an opening therebetween for communication, a flexible diaphragm for separating said first and second portions, a pressure actuated means having an upper end portion secured to said diaphragm and movable therewith and having a lower end portion adapted to open or close said opening between said inlet and outlet chambers, a member adapted to resiliently hold said means in position to close said opening whereby when pressure is increased in said pressure chamber, said pressure will depress said diaphragm and move said actuated means against said resilient member to open said opening between said inlet and outlet chambers and when said pressure is diminished in said pressure chamber, said resilient member will automatically move said means to close said opening between said inlet and outlet chambers.

6. In connection with a tank in the bottom of which a liquid collects, a drain valve structure having in combination, a container communicating with said tank and adapted to receive said liquid therefrom, a conduit connected to said container and extending upwardly thereinto for some distance, said conduit having openings at its upper end portion, a float disposed about said conduit in said container and movable on said conduit by said liquid in said container to control said openings, said conduit having a fluid lighter than said liquid flowing therethrough under pressure, an ejector and pressure chamber disposed in said conduit, a second conduit extending from said container to permit the discharge of said liquid therefrom, a valve disposed in said second conduit, means for opening and closing said valve, said means being controlled by pressure in said pressure chamber.

7. A drain valve structure adapted to be used in connection with a tank in the bottom of which a liquid collects, a container communicating with said tank and adapter to receive said liquid therefrom, a conduit communicating with said container and extending upwardly thereinto for some distance, said conduit being provided with openings at its upper end portion, means movable on said conduit in said container by said liquid in said container for controlling said openings, said conduit having a fluid lighter than said liquid flowing therethrough under pressure, an ejector and pressure chamber in said conduit, a second conduit communicating with said container and adapted to have said liquid from said container discharged therethrough, a valve disposed in said second conduit, means connected with said pressure chamber for opening and closing said valve, said means being controlled by pressure in said pressure chamber whereby as said float closes said openings pressure in said pressure chamber increases.

8. A drain valve structure adapted to be used in connection with a tank in the bottom of which a liquid collects, a container communicating with said tank and adapted to receive said liquid therefrom, a conduit communicating with said container and extending upwardly thereinto for some distance, said conduit having openings at its upper end portion, a float movable on said conduit in said container by said liquid in said container to control said openings, an ejector and pressure chamber disposed in said conduit, said conduit having a fluid lighter than said liquid moving therethrough under pressure, a second conduit communicating with said container and adapted to have said liquid from said container discharge therethrough, means disposed in said second conduit and connected to said pressure chamber for controlling the discharge of said liquid through said second conduit, said means being controlled by pressure in said pressure chamber whereby when said liquid in said container moves said float along said conduit to close said openings, said fluid flowing through said conduit will cause pressure to be increased in said pressure chamber whereby said pressure will move said means and cause the same to open said valve, thus permitting said discharge of said liquid whereby said float is lowered in said container, said openings are opened, said fluid flows into said container relieving said pressure in said pressure chamber, and said means moves to close said valve stopping the discharge of said liquid.

References Cited in the file of this patent
UNITED STATES PATENTS

| | | |
|---|---|---|
| Re. 21,741 | Samiran | Mar. 4, 1941 |
| 946,139 | Kitts et al. | Jan. 11, 1910 |
| 971,934 | Siegrist | Oct. 4, 1910 |
| 1,295,987 | Heath | Mar. 4, 1919 |
| 2,417,994 | Sleets | Mar. 25, 1947 |
| 2,525,154 | Taylor | Oct. 10, 1950 |